United States Patent [19]

Huber

[11] Patent Number: 4,836,919

[45] Date of Patent: Jun. 6, 1989

[54] DEVICE FOR REMOVING WASTE MATERIAL SCREENED OR FILTERED OUT OF LIQUID FLOWING THROGH A CHANNEL

[76] Inventor: Hans-Georg Huber, Zum Rachetal 8, D-8434 Berching, Fed. Rep. of Germany

[21] Appl. No.: 72,111

[22] Filed: Jul. 10, 1987

[30] Foreign Application Priority Data

Sep. 10, 1986 [DE] Fed. Rep. of Germany ....... 3630755

[51] Int. Cl.$^4$ ............................................. B01D 33/00
[52] U.S. Cl. .................................... 210/158; 210/159; 210/161; 210/241; 210/394
[58] Field of Search .............. 210/159, 158, 161, 162, 210/386, 241, 370, 374, 396, 394

[56] References Cited

U.S. PATENT DOCUMENTS

| | | | |
|---|---|---|---|
| 558,572 | 4/1886 | Schacke | 210/396 |
| 2,758,722 | 8/1956 | Murray | 210/394 |
| 2,911,098 | 11/1959 | Leithiser | 210/396 |
| 2,929,504 | 3/1960 | Lind et al. | 210/162 |
| 4,224,166 | 9/1980 | Wyman | 210/396 |
| 4,521,305 | 6/1985 | Deal | 210/158 |
| 4,634,524 | 1/1987 | Huber | 210/158 |
| 4,642,185 | 2/1987 | Turner et al. | 210/396 |

FOREIGN PATENT DOCUMENTS

| | | | |
|---|---|---|---|
| 3138674 | 6/1982 | Fed. Rep. of Germany | 210/159 |
| 213353 | 12/1984 | German Democratic Rep. | 210/396 |

*Primary Examiner*—Richard V. Fisher
*Assistant Examiner*—Coreen Y. Lee
*Attorney, Agent, or Firm*—Max Fogiel

[57] ABSTRACT

A device for removing waste material screened or filtered out of liquid flowing through a channel (1) has a basket-type interceptor (6) that is slanted and cylindrical and that rotates subject to power, extends to some extent into the liquid, and has its upstream face (8) open and its downstream face (9) solid. A conveyor (13) is positioned coaxially in relation to the interceptor, leads to a waste-material deposit point outside the liquid, accommodates a powered conveyor screw (18), and has an intake scoop (15) in the vicinity of the interceptor for collecting the waste material. A mechanism positioned stationary above the intake scoop releases waste material from the interceptor. The interceptor consists of a number of continuous annular disks (8) distributed along the outer surface with gaps between them and the waste-material releasing mechanism is a raker-stripper (28) that at least to some extent extends through the gaps between the annular disks.

10 Claims, 2 Drawing Sheets

DEVICE FOR REMOVING WASTE MATERIAL SCREENED OR FILTERED OUT OF LIQUID FLOWING THROGH A CHANNEL

The invention concerns a device for removing waste material screened or filtered out of liquid flowing through a channel, with a basket-type interceptor that is slanted and cylindrical and that rotates subject to power, extends to some extent into the liquid, and has its upstream face open and its downstream face solid, with a conveyor that is positioned coaxially in relation to the interceptor, that leads to a waste-material deposit point outside the liquid, and that accommodates a powered conveyor screw, whereby the conveyor has an intake scoop in the vicinity of the interceptor for collecting the waste material, and with a mechanism positioned stationary above the intake scoop to release waste material from the interceptor. This device is especially appropriate for sewage-treatment plants, but it can also be employed in other fields—in the textile industry and in slaughter houses, poultry farms, and tanneries for example.

A device of this type is known from German Pat. No. 3 420 157. The conveyor is positioned along the axis of the cylindrical surface of the interceptor and consists of a housing and of a screw, with the housing merging into an intake scoop in the vicinity of the interceptor. The interceptor is in the form of a sieve grate in that it is provided with slots for example. Its outer surface is completely solid and it rotates under power in such a way that the waste material accumulates on its inner surface and is forced up above the water level as the interceptor rotates. This design is practical in that no waste material has to be transferred from one component to another below the surface of the water. A waste-material releasing mechanism that operates in conjunction with the interceptor is positioned stationary on the outer surface of the interceptor and is intended for supplying the released waste material to the intake scoop. The releasing mechanism can have a brush and/or water-spraying nozzles. The drawback to a device of this type is that, as the interceptor rotates, the waste material falls from its inner surface uncontrolled and onto completely different points, not only in the vicinity of the releasing mechanism, that is. In fact, it even falls next to the intake scoop, where it arrives back in the liquid, whence it must be removed again by the interceptor. To counteract the uncontrolled fall of the waste material, the inner surface of the interceptor is provided with baffles that have a stabilizing effect on the waste material, which accordingly remains suspended from the inner surface of the interceptor until it arrives at the releasing mechanism outside the interceptor. The releasing mechanism must be positioned on the outer surface of the interceptor because of the baffles on its inner surface. The baffles, however, still block up the inside of the interceptor to some extent and accordingly have a deleterious effect on the design of the intake scoop. When the interceptor is connected to the screw to make it possible to employ only one motor, the connection is established by means of a driving arm positioned upstream of the open face of the interceptor and connecting the shaft of the screw to the interceptor. The driving arm needs a lot of space to rotate in, which also deleteriously affects the design of the intake scoop. The height of the upstream wall of the intake scoop within the channel in particular is accordingly limited, which in turn limits how full the interceptor can be, the water level, that is, which then entails a restriction in flow. The practical length of the interceptor is also restricted. All of these drawbacks, again, are augmented in accordance with how steeply the device is slanted into the channel. These drawbacks can be ameliorated to some extent by slanting the device less steeply, but this entails other problems. Since the solid face of the interceptor does not have any precipitating action, the efficiency of the device is reduced by the more gradual slant, which also reduces the exploitable water level. Optimally slanting the device, then, will result in geometry and design problems in relation to the intake scoop that will restrict the flow.

Another device that is positioned with its axis aslant is known from German Pat. No. 3 019 127. The interceptor in this case however, consists of stationary annular disks that are interrupted over approximately $\frac{1}{4}$ of their circumference at a point above the surface of the water. Associated with the stationary interceptor is a waste-material releasing mechanism in the form of a raking arm covered with raking components that is connected at the bottom to the shaft of the screw and is accordingly powered by the screw. Since the device slants into a channel that has a more or less continuous horizontal bottom, the raking arm has to be bent, which again restricts the design of the wall of the intake scoop, the exploitable water level, the flow rate, and the utilizable interceptor length. A third component is involved in addition to the interceptor and raking components: a stripper that is suspended at a fixed point in such a way that it can move, so that the waste material is initially transferred from where it accumulates on the interceptor below the water level to the raking component, whence it is conveyed up, and must then come into contact with the stripper in order to be conveyed into the intake scoop. The transfer of the waste material from one component to another below the water level is a drawback because a lot of the material goes back into the liquid from where it has accumulated. There is also no way of ensuring that the material will accumulate only in the vicinity of the stripper. The material will, rather, tend also to fall regularly next to the intake scoop due to the slanting axis of the device in the channel. The aforesaid geometrical situation also limits the height of the upstream wall of the intake scoop, creating a constriction that restricts the exploitable water level and hence the flow rate. Furthermore, plaits build up undesirably on the stationary interceptor, meaning that the waste material accumulates at points that do not come into contact with the raking component. This is especially true of the fins that the discontinuous-circumference disks are mounted on for the sake of stability. The distance between the annular disks and hence the width of the gap in the interceptor must be at least a certain minimum. Manufacturing conditions dictate that the gap cannot be less than 4 to 5 mm. The way that the direction the raking components rotate in is controlled is also complicated because it must involve forward and backward motions in relation to the stripper in order to ensure satisfactory stripping.

The object of the invention is to improve a device of the type originally described to the extent that the aforesaid drawbacks are at least considerably avoided. It should in particular be possible to employ a higher water level and hence increase the flow rate, and the waste material that accumulates on the interceptor must be reliably supplied to the intake scoop.

This object is attained in accordance with the invention in a device of the type initially described in that the interceptor consists of a number of continuous annular disks distributed along the outer surface with gaps between them and in that the waste-material releasing mechanism is a raker-stripper that at least to some extent extends through the gaps between the annular disks. The continuous annular disks considerably improve the stability of the device in the vicinity of the interceptor and make it easier to manufacture. The continuous gaps make it possible to employ a releasing mechanism in the form of a stripper that at least to some extent engages the gaps between the disks when necessary, making it possible to clean the raker-stripper better than in the case of a sieve grate. The raker-stripper can be positioned either inside or outside the interceptor, surprisingly allowing the wall of the intake scoop to be higher than previously possible, accordingly raising the water level and increasing the flow rate. The drawbacks associated with a raking arm are accordingly avoided. Since the interceptor is no longer stationary and has no stationary parts, no plaiting up will occur at that point. The waste material will accumulate below the water level only on the inner surface of the interceptor and will not come into contact with any other component below the water level. Since the material that is to be precipitated will accumulate in the vicinity of the raker-stripper, the point of deposit can be very precisely established, ensuring, in conjunction with the improved wall of the intake scoop that the waste material will be regularly supplied to the intake scoop, whence it will arrive in the conveyor. The rotating interceptor can be supported at each face, at two points that is, whereas a rotating state-of-the-art raking arm can be supported at only one end. An interceptor in accordance with the invention makes it possible to exploit the advantages of a precipitating effect on the waste material, which is possible only with annular disks and which has previously been known only in relation to stationary interceptors, in relation to a rotating interceptor as well.

The raker-stripper can be mounted on the outer surface of the interceptor and extend through the gaps between the annular disks from outside. The interceptor will accordingly be cleaned very thoroughly. It is, however, also possible to mount the raker-stripper on the inner surface of the interceptor. The volume taken up accordingly does of course reduce the range of possibilities for designing the intake scoop. Still, the resulting drawback can be compensated for because the raker-stripper and the intake scoop are both stationary parts that can be mutually adapted in this way. The intake scoop can be axially offset in relation to the interceptor in accordance with the steepness of the slant and have a wall that extends up approximately as far as the raker-stripper. The potential for making the wall of the intake scoop relatively higher allow the device to be filled to a higher level, making it appropriate for handling higher outputs without increasing its size. It is especially practical when the wall of the intake scoop is connected to the raker-stripper. To strengthen the connection between the components it is even possible to mount the raker-stripper stationary on the wall of the intake scoop. Eliminating a raker arm between the shaft of the screw and the interceptor allows the wall of the intake scoop to be higher in the vicinity of the open face of the interceptor in relation to the axis of the interceptor than in the vicinity of the solid face in order to obtain a higher water level and hence increase the filling level.

The annular disks can have the same outside diameter and graduated inside diameters, with the raker-stripper having graduated recesses that match the inside diameters.

One drive mechanism can be provided for the conveyor screw and another for the interceptor. This system will also make it possible to control the two drive mechanisms individually. It is also possible in the summer for instance to drive the conveyor while it is empty and without the interceptor rotating. It is practical to mount the interceptor-drive mechanism at the solid face of the interceptor, where there is enough room for the drive mechanism, its motor, and if necessary an intermediate transmission. The interceptor is also particularly stable at that point due to the solid face, and appropriate for the introduction of rotational forces.

The cross-section of the annular disks can be more or less a rounded triangle, and the disks can be positioned with their shortest distance facing the direction that the liquid flows through the interceptor in. Thus, the narrowest point will simultaneously constitute the point at which the waste material is precipitated, or the precipitation point and the flow through gap will be positioned directly next to each other in the one plane. This will also mean that any waste material that penetrates the narrowest point between two of the annular disks in the interceptor will not get stuck between two disks but will get rinsed away within a gap with an expanding section. Stones or other hard objects will accordingly not get jammed in the interceptor.

The invention will now be described with reference to the drawings, wherein

Figure 1:
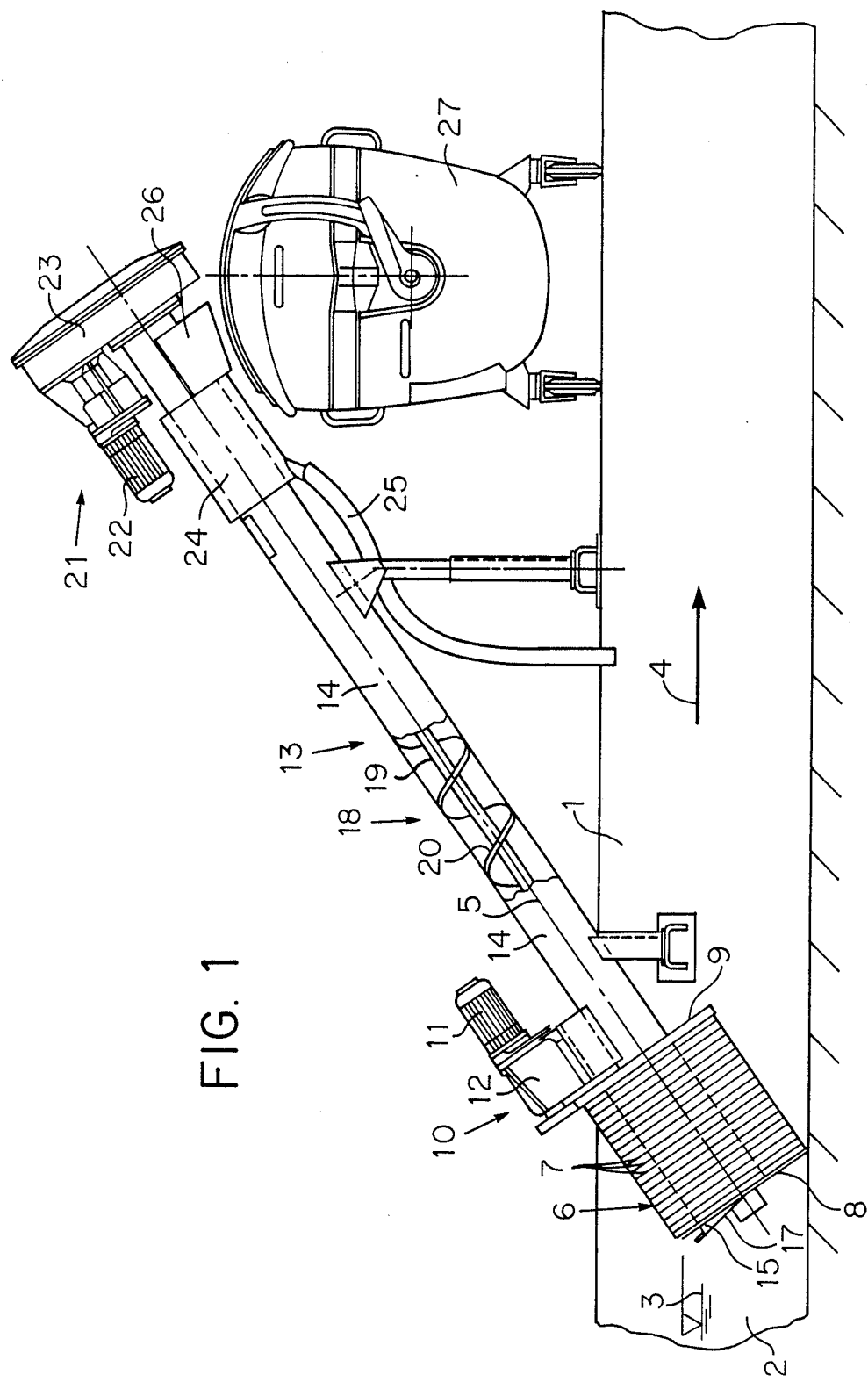
FIG. 1 is a schematic side view of the overall device.

FIG. 1 shows part of a channel 1, through which flows in the direction indicated by arrow 4 a liquid 2, its depth indicated by water level 3, contaminated with waste material that is to be screened or filtered out. A device is installed in channel 1 with its axis 5 slanted at an angle of preferably approximately 35°. The device has a cylindrical basket-type waste-material interceptor 6 that consists essentially of annular disks 7 with a continuous circumference connected together with gaps between them (cf. FIG. 3). Interceptor 6 has an upstream face 8 that is open and downstream face 9 that is closed. Interceptor 6 rotates around axis 5 subject to a drive mechanism 10, a motor 11, and if necessary a transmission 12.

A conveyor 13 that is coaxial with axis 5 and interceptor 6 has a cylindrical housing 14 that extends over most of the axial length of the conveyor. At the bottom, in the vicinity of interceptor 6, housing 14 merges into or is provided with an intake scoop 15 that is, like housing 14, stationary. Intake scoop 15 has a wall 16 (FIG. 2) that is high and narrow and merges at the lowest point into the upstream wall 17 of intake scoop 15. As will be evident from FIG. 1, upstream wall 17 slopes slightly in relation to the open face 8 of interceptor 6 such that waste material falling from even the highest point of the first annular disk 7 on interceptor 6 will drop into intake scoop 15. Water level 3 is demarcated by upstream wall 17. Since upstream wall 17 and if necessary the wall 16 of intake scoop 15 are comparatively very high, water level 3 can be high enough for interceptor 6 to be loaded over the accordingly expanded portion o its surface, which increases the output of the device.

Accommodated in housing 14 and in intake scoop 15 is a conveyor screw 18 with a shaft 19 and a conveying thread 20 that can be rotated by a drive mechanism 21 and a transmission 23. Housing 14 can be perforated at the top and surrounded by a jacket 24 to recirculate liquid, expelled as the waste material becomes compacted, back into channel 1 through a line 25, whereas the drained and compacted waste material is deposited in a container 27 through a chute 26.

Figure 2:
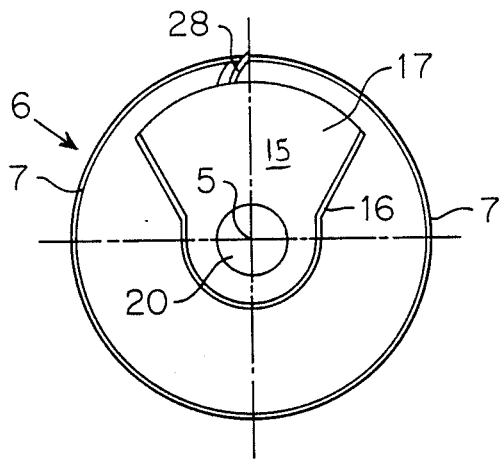
FIG. 2 is a view toward the open face of the interceptor.
Figure 3:
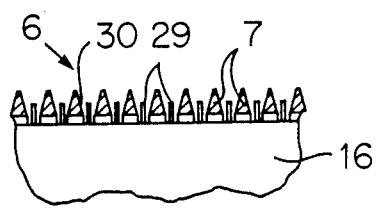
FIG. 3 is a longitudinal section through part of the interceptor, illustrating the shape of the cross-section of the annular disks.

Associated with rotating interceptor 6 is a waste-material releasing mechanism in the form of a stationary raker-stripper 28 either inside or outside of interceptor 6. Raker-stripper 6 can also be suspended from one point like a pendulum. It is generally in the form of prongs that extend at least to some extent into the access gaps 30 between annular disks 7. Prongs 29 can extend through the gaps either from the outside in or from the inside out in relation to the annular disks 7 in interceptor 6. The raker-stripper illustrated in FIGS. 2 and 3 is inside interceptor 6, on or next to intake scoop 15 for example, and the individual prongs 30 extend through the access gaps 30 between the annular disks 7 on interceptor 6 from the inside out. Annular disks 7 can have the more or less rounded-apex triangular cross-section illustrated in FIG. 3, with the narrowest points facing the direction of flow between annular disks 7, where, that is, the waste material accumulates. The narrowest points accordingly expand in the direction of flow through access gaps 30 such that waste material that has passed through the narrowest points will not in practical terms get wedged or jammed between annular disks 7.

The device can be operated in a great many ways. Usually interceptor 6 will always rotate once at intervals of time. When interceptor 6 is not rotating, the waste material will accumulate along its inner circumference between annular disks 7, resulting eventually in a backing up of the material to be precipitated or of the layer thickness. The flow resistance of the interceptor 6 in channel 1 will increase, and water level 3 will rise. At a particular water level 3, which must be no higher than the lowest point of the upstream wall 17 of intake scoop 15, drive mechanism 10 will be switched on and interceptor 6 will rotate at least once. The waste material accumulated on the inner circumference of interceptor 6 will be removed from the water without being transferred to other components and will arrive in the vicinity of stationary raker-stripper 28 above intake scoop 15. Raker-stripper 28 ensures that waste material will be taken from the accumulation surface of interceptor 6 and will fall into intake scoop 15. The precipitating surface of interceptor 6 will simultaneously be cleaned and will be available for further use. It will be evident that interceptor 6 can also be operated continuously when the load is very heavy, resulting in continuous separation.

The waste material that falls between the threads 20 of the screw 18 on conveyor 13 is entrained by the rotating screw up into housing 14 and simultaneously compacted and drained. The water in housing 14 flows back down into channel 1. The real compacting occurs, however, at the upper end of conveyor 13 and upstream of chute 26, with additional water expelled through line 25. The compacted and drained waste material is deposited in container 27. It will be evident that the mechanism 21 that drives conveyor 13 can also be operated either continuously or discontinuously, specifically in synchronization with the mechanism 10 that drives interceptor 6. Thus, in summer, in a sewage-treatment plant for example, it is possible to operate interceptor 6 discontinuously and to operate conveyor 13 during each rotation of interceptor 6 until the waste material has been deposited in container 27 to eliminate as much odor as possible. It is on the other hand also possible to allow the waste material to back up in conveyor 13 and to let it flow through as slowly as possible in order to drain out as much water as possible.

I claim:

1. An arrangement for removing waste material within a liquid and to be screened or filtered out of the liquid flowing through a channel, comprising: a rotatable basket-shaped cylindrical interceptor in slanted position and rotating with applied power; said interceptor extending substantially into the liquid and having an upstream open face and a downstream face that is solidly closed; a conveyor positioned coaxially relative to said interceptor and leading to a waste-material deposit location outside the liquid; said conveyor having a powered conveyor screw and an intake scoop wall in vicinity of said interceptor for collecting waste material; means positioned stationary above said intake scoop wall for releasing waste material from said interceptor; said interceptor comprising a plurality of continuous annular disks distributed along an outer surface with continuous gaps between said disks; said means above said intake scoop wall for releasing waste material comprising a raker-stripper extending at least substantially through said gaps between said annular disks for cleaning said raker-stripper; said taker-stripper being positioned relative to said interceptor for increasing the intake scoop wall height above a predetermined level to raise water level and increase flow rates above predetermined values, said waste material accumulating below the water level and only on the interceptor inner surface and in vicinity of the raker-stripper for supplying said intake scoop wall regularly with waste material; said rotatable interceptor being supportable at each face; a housing with a free space between said housing and said annular disks; said intake scoop wall being displaced downward in axial direction relative to said interceptor; said intake scoop wall having an upstream wall, and a side wall; said upstream wall extending up to the height of said raker-stripper and sloping slightly in relation to a face of said interceptor.

2. An arrangement as defined in claim 1, wherein said raker-stripper is mounted on an outer surface of said interceptor and extends through said gaps between said annular disks from outside.

3. An arrangement as defined in claim 1, wherein said raker-stripper is mounted on an inner surface of said interceptor.

4. An arrangement as defined in claim 1, wherein said intake scoop wall is connected to said raker-stripper.

5. An arrangement as defined in claim 1, wherein said intake scoop wall is higher in vicinity of said interceptor openface relative to the interceptor axis than in vicinity of said solidly closed face.

6. An arrangement as defined in claim 1, wherein said annular disks all have the same outside diameter and graduated inside diameters, said raker-stripper having recesses graduated for conforming to said inside diameters.

7. An arrangement as defined in claim 1, including one drive means for driving said conveyor screw; and another drive means for driving said interceptor.

8. An arrangement as defined in claim 7, wherein said another drive means for driving said interceptor engages said solidly closed face of said interceptor.

9. An arrangement as defined in claim 1, wherein said annular disks have a cross-section in form of a rounded triangle positioned with narrowest distance facing direction of liquid flow.

10. An arrangement for removing waste material within a liquid and to be screened or filtered out of the liquid flowing through a channel, comprising: a rotatable basket-shaped cylindrical interceptor in slanted position and rotating with applied power; said interceptor extending substantially into the liquid and having an upstream open face and a downstream face that is solidly closed; a conveyor positioned coaxially relative to said interceptor and leading to a waste-material deposit location outside the liquid; said conveyor having a powered conveyor screw and an intake scoop wall in vicinity of said interceptor for collecting waste material; means positioned stationary above said intake scoop wall for releasing waste material from said interceptor; said interceptor comprising a plurality of continuous annular disks distributed along an outer surface with continuous gaps between said disks; said means above said intake scoop wall for releasing waste material comprising a raker-stripper extending at least substantially through said gaps between said annular disks for cleaning said raker-stripper; said raker-stripper being positioned relative to said interceptor for increasing the intake scoop wall height above a predetermined level to raise water level and increase flow rates above predetermined values, said waste material accumulating below the water level and only on the interceptor inner surface and in vicinity of the raker-stripper for supplying said intake scoop wall regularly with waste material; said rotatable interceptor being supportable at each face; said raker-stripper being mounted on an outer surface of said interceptor and extending through said gaps between said annular disks from outside; said intake scoop wall being axially offset relative to said interceptor, said intake scoop wall extending substantially to a level of said raker-stripper, said intake scoop wall being connected to said raker-stripper; said intake scoop wall being higher in vicinity of said interceptor openface relative to the interceptor axis than in vicinity of said solidly closed face; said annular disks all having the same outside diameter and having graduated inside diameters, said raker-stripper having recesses graduated to conform to said inside diameters; a first drive means for driving said conveyor screw; a second drive means for driving said interceptor; said second drive means engaging said solidly-closed face of said interceptor; said annular disks having a cross-section shaped in form of a rounded triangle positioned with narrowest distance facing direction of flow of said liquid; a housing with a free space between said housing and said annular disks; said intake scoop wall being displaced downward in axial direction relative to said interceptor; said intake scoop wall having an upstream wall, and a side wall; said upstream wall extending up to the height of said raker-stripper.

* * * * *